Sept. 24, 1940.   C. W. EARP   2,215,781
RADIO DIRECTION FINDER AND COURSE INDICATING DEVICE
Filed Oct. 15, 1937   2 Sheets-Sheet 1

INVENTOR
C.W. EARP
BY E.D.Phinney
ATTORNEY

Sept. 24, 1940.                     C. W. EARP                         2,215,781
                RADIO DIRECTION FINDER AND COURSE INDICATING DEVICE
                         Filed Oct. 15, 1937            2 Sheets-Sheet 2

INVENTOR
C. W. EARP
BY
                *E. D. Whinney*
ATTORNEY

Patented Sept. 24, 1940

2,215,781

UNITED STATES PATENT OFFICE 2,215,781

RADIO DIRECTION FINDER AND COURSE INDICATING DEVICE

Charles William Earp, London, England, assignor to International Standard Electric Corporation, New York, N. Y.

Application October 15, 1937, Serial No. 169,197
In Great Britain November 6, 1936

8 Claims. (Cl. 250—11)

This invention relates to radio direction finding or course indicating devices of the type in which currents from a directional antenna, such as a loop, are intermittently combined with currents from a non-directional antenna under the control of a switching device operating at a predetermined frequency, the combined currents after detection being impressed together with currents of the switching frequency, upon a differential device which according to the phase of the H. F. signal in the loop, that is, according to the direction of the incoming signal, gives an appropriate indication of course or direction.

Important objects of the present invention are to increase the sensitivity of such devices, to effect a reduction in the number of the component parts thereof and in general to improve their operation and efficiency.

According to one feature of the invention the switching of the directional antenna is effected by a single valve oscillator or a pair of symmetrically arranged valves the combined currents being applied after detection to the valve oscillator in such a way that it functions as a detecting device for controlling the operation of the course indicating means.

This and other features of the invention specified in the appended claims will be more fully appreciated from a consideration of the following detailed description taken in conjunction with the accompanying drawings in which:

Figure 1:
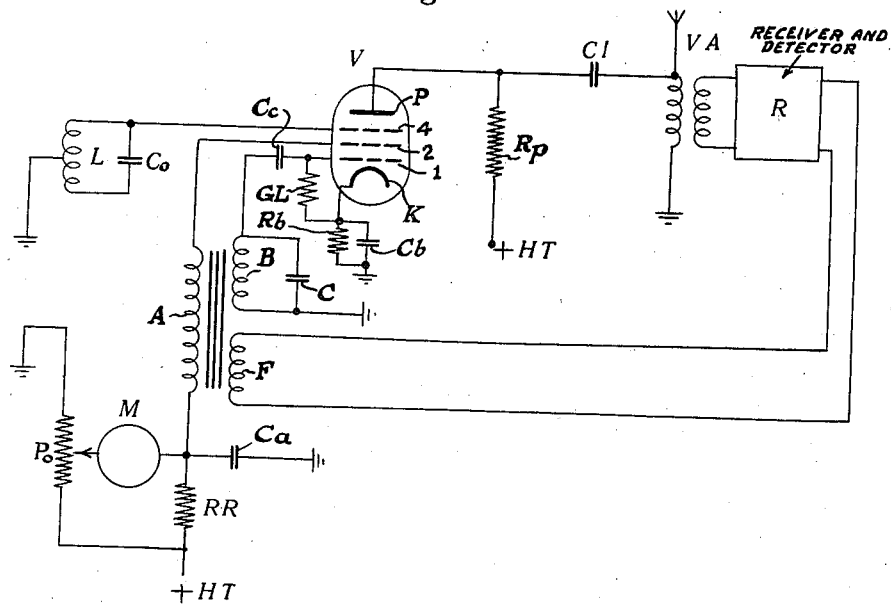
Fig. 1 shows schematically a simple embodiment of our invention using a single pentode valve.

Referring first to Fig. 1, a loop antenna L, tuned by means of a condenser Co, is connected at one end to one grid 4 of a pentode valve V, the centre tap of the loop being connected to earth. The plate P of valve V is fed over resistor Rp from +HT and is coupled through a condenser CI to the input circuit of a radio receiver R to which is also coupled the vertical antenna VA.

The two inner grids 1 and 2 of the valve V are connected in back coupled circuits RR—A and B—C so that with the cathode K they form a low frequency oscillator which operates at about 100 cycles per second. The anode grid 2 is fed over circuit RR—A from positive potential source +HT, condenser Ca serving to by-pass RR. The control grid is coupled to its circuit B—C over condenser Cc and is returned to the cathode K over grid-leak GL, thus providing a leak bias for grid 1. Cathode K is returned to ground through resistor Rb by-passed by condenser Cb, thus providing a further bias for grid 1. The output of the receiver is also coupled via winding F to the tuned grid circuit B—C of the oscillator portion of the valve. A meter M is connected across a resistance RR in the anode-grid circuit A of the oscillator portion, a potentiometer Po being provided for adjusting its zero reading.

The result of the oscillation of the triode portion K—1—2 of the valve V is to cut off the electron stream at the frequency of the oscillator, that is, 100 times per second. Suppose for example that when the loop L is turned slightly "right" (or clockwise) from its position of zero pick-up the signal applied to valve V produces an additive effect upon the signal from the vertical antenna VA in the plate circuit. When the electron stream of the valve is switched by the 100 cycle oscillator the signal from the vertical antenna will be intermittently augmented by the signal from the loop and will in effect be modulated at a frequency of 100 cycles.

If now the loop L is rotated "left" through and beyond its position of zero reception, the phase of the signal on the control grid 4 of valve V will be reversed and additions of signal in the plate circuit will become subtractions. The phase of the 100 cycle modulation is thus inverted. The modulated signal is amplified and detected in the radio receiver R which gives as an output the 100 cycle modulation applied by the loop switching. These low frequency currents add to or subtract from the oscillator voltage, according to the direction of the signal transmitter and cause marked variations of the oscillator plate current and the voltage across resistance RR. The "course" meter M is set by the potentiometer Po to read zero for the normal plate current of the oscillator and reads positive or negative according to the deflection of the loop L from its position of zero pick-up.

Figure 2:
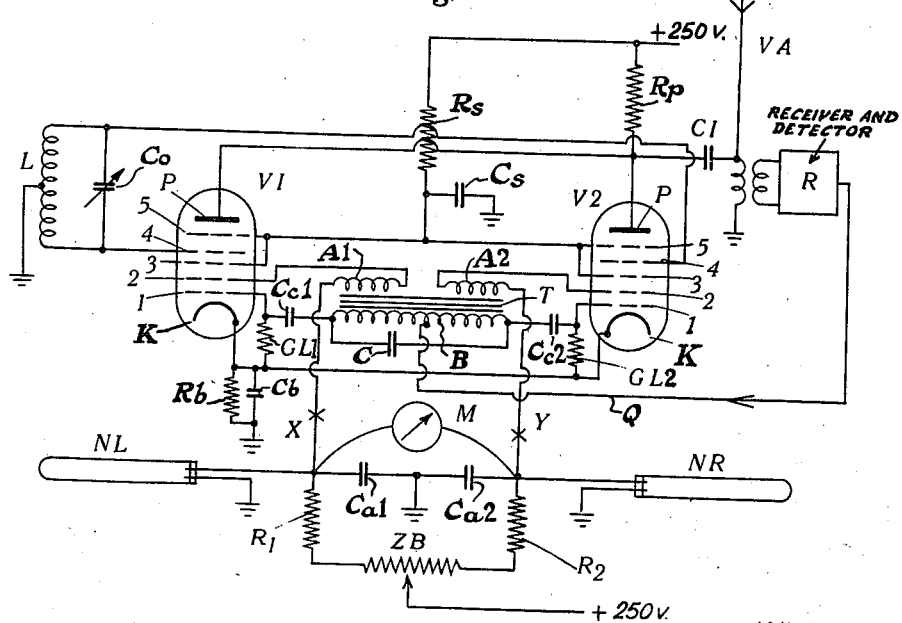
Fig. 2 is a circuit diagram of a more practical embodiment of the invention utilising a symmetrically-arranged pair of heptode valves.

In the modification illustrated in Fig. 2 two symmetrically arranged heptode valves are used.

The loop L is tuned, its centre tap being connected to earth, and its two ends being connected to the signal-grids 4 of the two heptode valves V1 and V2.

The plates P of the two heptodes are strapped together, the high tension voltage being supplied through a resistance RP, from a potential 250 volts above earth. The plates are coupled through a condenser C1 to the aerial terminal of a radio receiver R. A "vertical" aerial VA is attached to the same terminal.

Now, the signal voltage on the signal-grids (grids No. 4) of the heptodes is in phase or antiphase with the electric field of the signal. (The E. M. F. in the loop L is 90° displaced from the phase of the electric field, but, the loop being tuned, the voltage across the loop is 90° displaced from the E. M. F. applied.)

The E. M. F. applied to the radio receiver R, due to the loop signal (being 180° displaced from the heptode grid voltages, the phase being reversed by the valve) is in phase or antiphase with the electric field of the signal. As the E. M. F. in the vertical aerial is in phase with the exciting electric field, it will be seen that E. M. F's (and hence voltages too) applied to the radio receiver, due to "loop" signals and "vertical" signals, are exactly in phase or antiphase.

If the two heptode valves give equal "gain", it will be seen that the resultant output in the common plate circuit from the antiphase voltages applied to the grids, is zero. If, however, one valve is effectively cut out of circuit, the other valve supplies a signal which either adds to, or subtracts from the "vertical" signal.

Referring again to Fig. 2, grids 3 and 5 of each valve serve only as screening grids. They are tied together and earthed through a condenser Cs, a suitable positive voltage being supplied through a resistor Rs from +H. T. Grids 1 and 2 of each valve are connected up as a push-pull low frequency oscillator which operates at about 100 cycles per second. The grids No. 1 operate as oscillator grids, and are coupled over condensers Cc1, Cc2 to a tuned circuit comprising a centre-tapped winding B on transformer T and a condenser C. Two other windings A1 and A2 form the plate circuit, being connected to the anode-grids (No. 2 on each valve). The high tension supply is provided through two separate resistors R1, R2, by-passed by condensers Ca1 and Ca2, and through a potentiometer ZB which will be mentioned later. Grid leaks GL1 and GL2, cathode resistor Rb, and by-pass condenser Cb are connected substantially as in Fig. 1.

The effect of oscillation is to put, alternately, a positive, then negative, potential on the grids (No. 1) of each valve. The electron stream of each valve is cut off each time grid 1 swings negative: the two electron streams are cut off alternately, 100 times per second.

Suppose, now, that the loop is turned slightly "right" (or clockwise) from its position of zero pick-up, and that the signal applied to V1 produces an additive effect on the "vertical" signal in the plate circuit. The loop signal applied to V2 will, of course, subtract from the "vertical" signal. Therefore, when the electron streams of the two valves are being switched by the 100 cycle oscillator, the "vertical" signal will be successively augmented and diminished by signal from the loop. In effect, it is modulated at a frequency of 100 cycles.

If, now, the loop is rotated left through and beyond its position of zero reception, the phase of the signal to each valve will be reversed.

Additions of signal in the plate circuit will become subtractions and vice versa. The result is a similar 100 cycle modulation of the "vertical" signal, but the phase of this modulation is inverted.

The phase of the modulation is the same as the voltage supplied to grid 1 of V1, or else the same as grid 1 of V2, according to the position of the loop, left or right of its position of zero signal.

Visual indication of the phase of the low-frequency modulation of the signal is obtained as follows:

The modulated signal is amplified in the radio receiver R, and detected in the normal manner. The receiver may be a "straight" set, or a super-heterodyne receiver. The signal may be heterodyned for aural reception, or simply detected as a broadcast or telephone signal. In the case of heterodyne reception, however, an additional detector is necessary to produce an output of switching frequency (100 cycles/second). Whatever type of receiver is used, its function is simply to amplify the signal and detect it, giving as an output the original modulation of the signal applied to it. The chief (or perhaps only) component of this modulation is, of course, the 100 cycle modulation applied by the loop switching.

This 100 cycle output from the receiver is merely applied over lead Q between the centre-tap of the grid winding B of transformer T and "ground". The 100 cycle voltage is thus impressed on grid 1 of each valve. It may be assumed to be in phase with oscillator voltage on grid 1 of V1, and antiphase with oscillator voltage on grid 1 of V2 when the loop is right of zero reception, and vice versa for loop positions left of zero.

Applied voltage in phase with the oscillator voltage increases the oscillator voltage on the valve concerned. This, of course, tends to increase the current flowing through the corresponding grid-leak GL1 or GL2, this current being a measure of the voltage applied to the grid. The effect of antiphase voltage on the other grid 1 is to cause a marked reduction of grid current.

It is now evident that a voltage indicating device connected between the grids (No. 1) of the two valves would read + or − according to the sense of deflection of the loop from the position of zero reception. The oscillator grids behave as the two units of a differential detector, the oscillator voltage being applied in "push-pull" and the receiver output in "parallel."

The "course" indicating device is not, however, connected between the two grids (No. 1) for the unbalance voltages are greatly amplified by the valves. The oscillator valves act as D. C. amplifiers of the grid-unbalance voltages. The resulting unbalance of current flowing through the anodes (i. e., grids No. 2) is used to operate the indicating device.

In practice, when resistances of 50,000 ohms are connected between H.T.+ and points X and Y, voltage fluctuations of X and Y may be 40 volts. Such voltage fluctuations are ideal for operation of neon tuning indicator lamps commonly used in broadcast receivers. Incidentally, the voltage between these points and ground happens to be about 150 volts, which is ideal for the operation of neon tubes.

When two lamps NL and NR are connected in this manner, voltages may be adjusted so that each lamp glows faintly in the base for zero signal, or "on course". As voltage rises on X and Y according to the left or right displacement of the loop or signal, a beam of light rises up the corresponding tube NL or NR.

The use of neon tubes in this manner has several particular advantages.

1. Such devices have no mechanical time constants. It is actually possible to read directions when two Morse signals are present, when the neon tubes flash according to the keying.

2. Heavy static crashes give flashes, but do not change the position of the steady column of light.

3. False operation is impossible: a complete overloading of the radio receiver is accompanied by simultaneous operation of the two neon tubes, giving no bearing rather than a reverse bearing.

A course meter M may also be connected between points X and Y should this be preferred. It is possible that the meter will be preferred in any cases where lighting is particularly bright. On the other hand, the neon indicators will be more valuable for night flying of aircraft.

The potentiometer ZB is used to set the meter to zero, or for balancing two neon tubes, and/or for balancing any other circuit components.

When the oscillator constants are not perfectly symmetrical, one unbalanced condition causes the oscillator to take up a different frequency from that in the opposite unbalanced condition. The change of note can be used to indicate left or right, instead of, or in addition to, the other devices.

The following are other important advantages of the above-described arrangements:

1. Perfect symmetry is achieved with no tendency to give a "wandering zero" on the course meter M.

2. Complete and efficient switching of the loop pick-up is obtained.

3. The differential voltage, i. e., the unbalance of the two grids caused by the receiver output is much amplified on the triode plates, giving great sensitivity.

Figure 3:
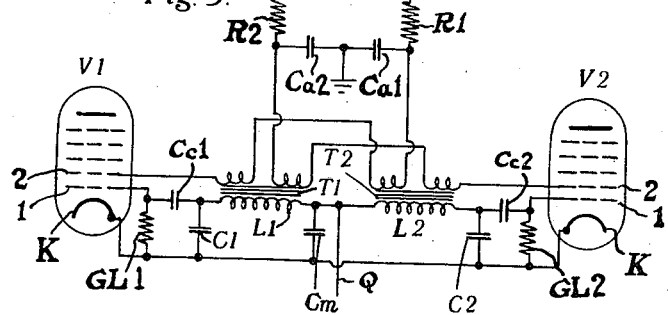
Fig. 3 is a schematic showing how the oscillator portion of Fig. 2 may be modified to provide an additional facility.

A double stability oscillator may be used to give a very marked change of note, giving aural indication of course in telephones attached to the radio receiver. Fig. 3 shows the connections of the oscillator circuits only for obtaining this effect.

The oscillation of the two triode portions of the heptode valves VI, V2 shown, is produced by the connection of two transformers TI and T2.

Such an oscillator is capable of oscillating on either of two frequencies, corresponding approximately to the resonances of CI—LI—Cm, and C2—L2—Cm. In the first case VI may be considered to be oscillating and controlling the operation of V2: in the second case V2 controls the oscillation of VI. Coupling between the valves is tight enough to prevent oscillation on two frequencies at once.

The two frequencies of oscillation may be quite different, say 150 cycles and 300 cycles, according to the choice of constants LI—CI, and L2—C2.

Such a double-stability oscillator will remain upon one frequency unless some disturbing influence favours the other mode of oscillation.

During either mode of oscillation, each valve receives oscillator voltage on its grid, and the electron stream of each valve is modulated.

If, now, such an oscillator be used to replace that shown in Fig. 2, the output from the radio receiver applied to lead Q will be in phase or antiphase with oscillator voltage on VI or V2 according to the signal bearing.

An in-phase voltage increases the total oscillator voltage on the valve concerned, and causes that valve to dominate the oscillation. Thus, according to the signal bearing, "left" or "right," VI or V2 dominates the oscillation, giving the corresponding characteristic frequency of oscillation.

Although the use of two heptode valves has been described in connection with Figs. 2 and 3 it will be appreciated that other forms of multigrid valves such as pentodes, pentagrids, hexodes and octodes are equally suitable for use in such circuits.

Moreover the invention is not confined to the use of multi-grid valves, as described. Though heptode or octode valves are preferred, valves of the triode or tetrode type may be connected as the balanced modulator system composed of VI and V2 in Fig. 3.

Figure 4:
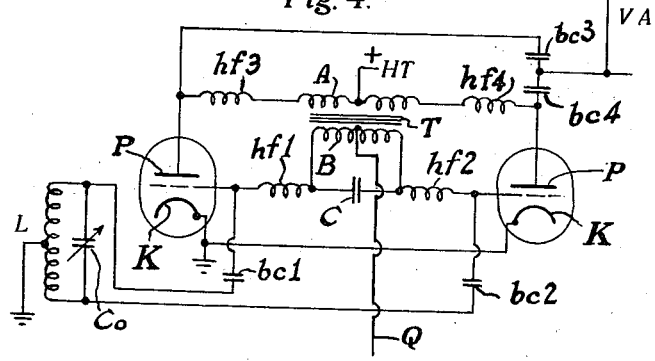
Fig. 4 is a modification employing a pair of triode valves.
Figure 5:
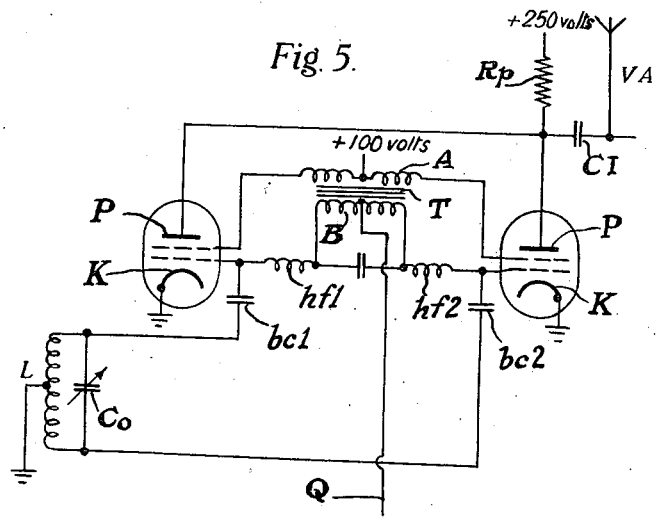
Fig. 5 is a further modification employing a pair of tetrode valves.

Fig. 4 shows two triodes connected in a manner which would permit them to be used for amplification of the loop signal, and for the switching thereof. Fig. 5 shows a similar balanced modulator, but in this case two tetrodes are used.

Neither of the above figures need detailed description. They only differ from Fig. 2 in that where a single electrode is used both for signal and for the low frequency oscillator, a high-frequency choke $hf1$—$hf4$ is connected in series with the oscillator lead, and a small condenser $bc1$—$bc4$ is connected in series with the high-frequency signal lead.

Other modifications coming within the scope of the claims will readily occur to those versed in the art. For example the oscillator portions of the heptode valves may be connected as a multivibrator for the generation of square-form waves which will give great switching efficiency.

What is claimed is:

1. Apparatus responsive to the direction of propagation of radio waves, comprising a directional antenna system, a non-directional antenna system, a local source of oscillations, means including a modulating tube for modulating waves received by said directional antenna system in accordance with said oscillations, means for combining said modulated waves with waves received from said non-directional antenna system, means for detecting said combined waves, means for applying said detected waves to said modulating tube, and means to vary the amplitude of the local oscillations in accordance with the relative position of said directional antenna for controlling said modulating tube in accordance with said variation in amplitude to produce signals corresponding to the direction of propagation of the incoming waves.

2. Apparatus responsive to the direction of propagation of radio waves, comprising a directional antenna system, a non-directional antenna system, a local source of oscillations, means including a modulating tube for modulating the waves received by said directional antenna system in accordance with said oscillations, means for combining said modulated waves with waves received from said non-directional antenna system, means for detecting said combined waves, means for applying said detected waves to said modulating tube to vary the amplitude of the local oscillations and thereby to vary the mean plate current of said modulating tube, and means responsive to such variations of said plate current for indicating the direction of propagation of the incoming waves.

3. Apparatus responsive to the direction of propagation of radio waves, comprising a directional antenna system, a non-directional antenna system, an oscillator tube, connections for causing said tube to produce oscillations, means for modulating waves received by said directional antenna system in accordance with said oscillations, means for combining with said modulated waves, waves received from said non-directional antenna system, means for detecting said combined waves, means for applying said detected combined waves to said oscillator tube to vary the amplitude of the oscillations produced thereby, and means responsive to such variations in the strength of oscillations for indicating the direction of propagation of the incoming radio waves.

4. Apparatus responsive to the direction of propagation of radio waves according to claim 1 wherein said local source of oscillations comprises a portion of said modulating tube and connections external thereto for causing said tube to generate oscillations.

5. Apparatus responsive to the direction of propagation of radio waves, comprising a directional antenna system, a non-directional antenna system, two valves each having a cathode and a plurality of further electrodes including an anode, symmetrically arranged and differentially connected with respect to waves received from said directional antenna system, an oscillator circuit comprising the cathode and two of the further electrodes of each of said valves for generating low frequency oscillations whereby the electron stream of each valve is periodically varied at the frequency of said oscillations, a combining circuit coupled to the anodes of said valves and to said non-directional antenna system, detecting means coupled to said combining circuit for detecting the combined signals of said valves and non-directional antenna system, means for applying the signals detected by said detecting means to said oscillator circuits to vary the amplitude of said low frequency oscillations and thereby to vary the mean current flowing through one of said further electrodes of each of said valves, means responsive to such variations in said mean current for indicating the direction of propagation of the incoming radio waves.

6. Apparatus according to claim 5, wherein said means for indicating the direction of propagation of the incoming radio waves comprises two circuits, one associated with the anode of each of said valves and a voltmeter connected between a first point in one of said anode circuits and a second point in the other of said anode circuits which for "on course" conditions is at the same potential as said first point.

7. Apparatus according to claim 5 wherein said oscillator circuit includes a network of reactances having sufficient degrees of freedom to permit stable oscillations at either of two different oscillation frequencies and wherein said means for indicating the direction of propagation of the incoming radio waves comprises means for producing different indications in dependance upon different frequencies of oscillation of said oscillator circuit.

8. Apparatus according to claim 5 in which said means for indicating direction of the incoming radio waves comprises two neon tubes, one associated with an electrode of each of said valves.

CHARLES WILLIAM EARP.